March 25, 1958  A. SILVERMAN  2,828,133
CHUCK GRIP FOR SEWER AUGER
Filed March 20, 1957
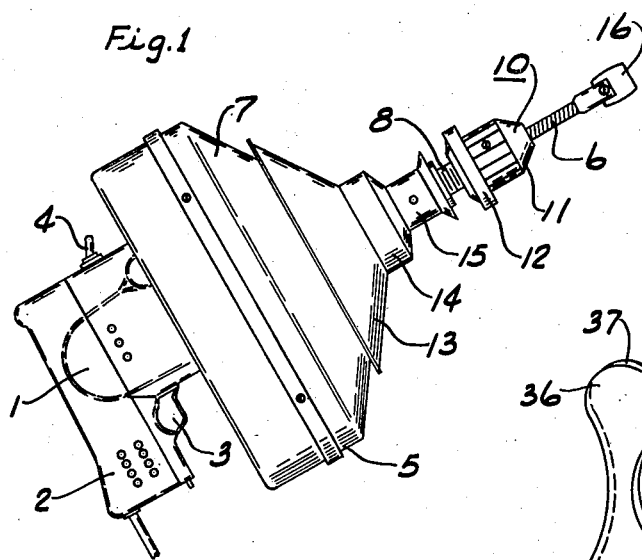
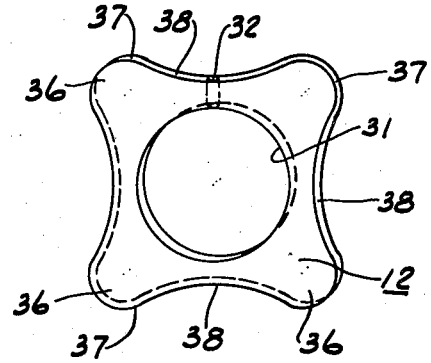
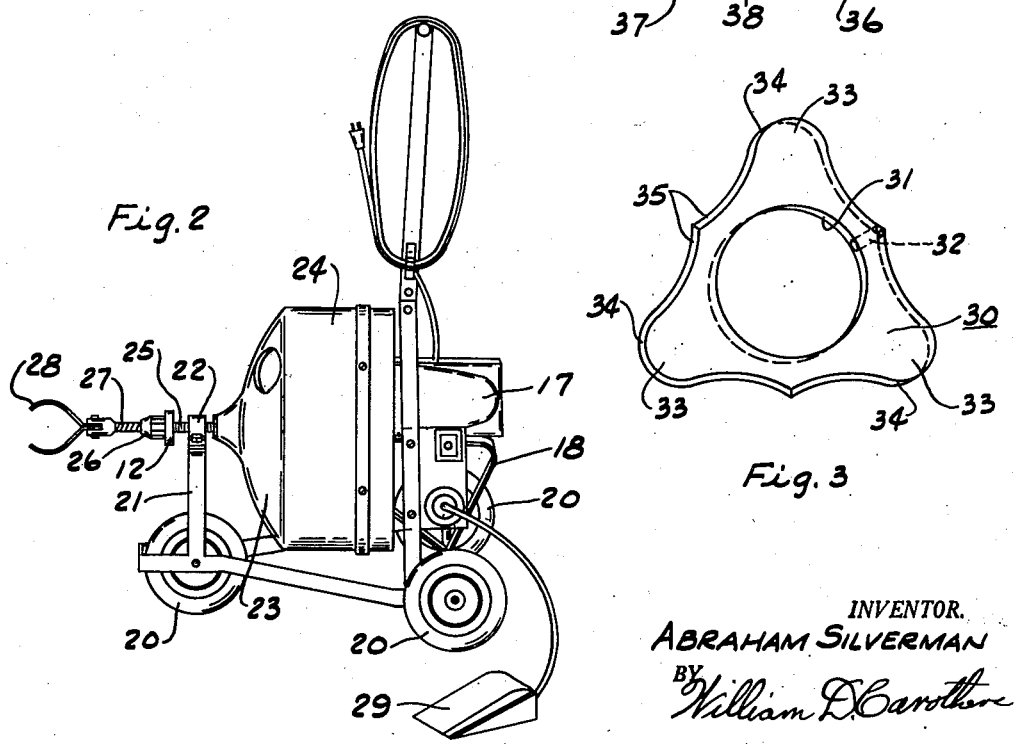
INVENTOR.
ABRAHAM SILVERMAN
BY
HIS ATTORNEY

United States Patent Office 2,828,133
Patented Mar. 25, 1958

2,828,133
CHUCK GRIP FOR SEWER AUGER
Abraham Silverman, Pittsburgh, Pa.

Application March 20, 1957, Serial No. 647,264

4 Claims. (Cl. 279—83)

This invention relates to hand grips for use on chucks to tighten and loosen the chuck on snake cleaning tools.

Chucks, such as those known as Jacobs chucks, use beveled gear keys which fit a corresponding gear on the chuck sleeve for tightening and loosening the same. This type of chuck is not good for tools that have plenty of clearance around the chuck. It takes time to find and use the key, which is usually lost entirely eventually, and if chained to the tool it gets caught and is then lost.

The chuck sleeve is usually made small and a material cost would be added if the sleeve was made larger in diameter for the same size chuck without materially improving the grip. It would also add material weight to the tool which is undesirable, as the flexible snake line making up the tool is heavy enough when contained within its container on the end of the tool.

These problems have been overcome by providing a light weight hand grip that has large spaced knobs that are readily gripped by the hands to operate the chuck. Such a grip may be used to readily actuate the chuck when the hands are wet and slimy. If the chuck sleeve with its usual fluted surface was merely made larger it would still be difficult and sometimes impossible with greasy hands to loosen the chuck to feed more of the snake cleaning tool to the sewer and tighten the same. The chuck must be made tight to screw the snake into and around the bends and elbows of the drain or to cut the roots through the sewer.

Other objects and advantages appear hereinafter in the following description and claims.

The accompanying drawings show for the purpose of exemplification without limiting this invention or the claims thereto, certain practical embodiments illustrating the principles of this invention; wherein—

Fig. 1 is a view in side elevation of a motor driven hand drain and sewer cleaning tool.

Fig. 2 is a perspective view of a motor driven cart drain and sewer cleaning tool.

Fig. 3 is an enlarged view in front elevation showing a triangular hand grip.

Fig. 4 is an enlarged view in front elevation of a square hand grip.

Referring to Fig. 1 of the drawings, the hand implement shown therein provides a hand drill type motor 1 having a handle member 2 with a trigger switch member 3. A reversing switch is indicated at 4 which reverses the direction of rotation of the armature of the motor. This hand type motor operates a pinion which in turn engages a ring gear on the inside of the container 5 which is rotatably mounted on the casing of the motor 1 and is hollow so as to receive in coil form the snake cleaning line 6. The outer end of the container 5 has a conical section 7 which ends in a tubular member 8 and the outer end of the tube 8 is provided with a chuck member 10. The outer sleeve 11 of the chuck is fluted as usual as indicated in the drawings and is provided with the chuck grip member 12 which forms the improvement of this invention.

The conical section 7 of the container 5 has rotatably mounted thereon, a conical member 13 which is provided with a shoulder portion 14 and a smaller cylindrical portion 15. This shield 13 is rotatably mounted on the conical portion 7 of the container 5 and permits one to grasp the same with the left hand to steady the forward portion of the machine adjacent the chuck member 10.

Tools such as indicated by the cutter member 16 are secured to the end sewer auger line 6.

As shown in Fig. 2 the motor 17 is mounted on the carriage 18 supported by the wheel members 20 of which there are three members. The forward wheel is provided with an upstanding frame 21 carrying the bearing 22 for supporting the cylindrical portion on the forward end of the conical section 23 of the drum or container 24. The cylindrical section 25 which is housed in the bearing 22 has mounted on its outer end the chuck member 26 and is likewise provided with a chuck grip member 12. The chuck 26 and the chuck 10 are substantially the same although one may be constructed to clamp on a larger diameter sewer auger line than the other. The sewer auger line 27 shown in Fig. 2 is larger than that illustrated at 6 in Fig. 1 and is provided with the root cutter tool as illustrated at 28.

The motor 17 is likewise provided with a pinion on the end of its shaft which engages the ring gear that is secured to the rotary housing 24. This device is provided with a foot pedal switch as indicated at 29.

In operating both of these machines for cleaning drains and sewers the line or sewer auger is drawn out of the drums 5 and 24 through the respective chucks 10 and 26 until it has penetrated as deep as it will go in the drain or sewer. The respective chucks are then tightened by means of the chuck grips 12 and the operation of the motors 1 and 17 which operates the housing 5 and 24 will also cause the auger lines 6 and 27 to rotate. Their rotation when in the pipe together with the application of a force shoving the line further into the drain or pipe permits the tool to negotiate the turns and when it has reached the blockage to carve the same so as to open the drain or sewer and provide free passage therethrough.

As shown in Figs. 3 and 4, the hand grips 12 and 30 are each provided with a bore 31 to receive the sleeve of the chucks 10 or 26. As shown in Figs. 1 and 2, each of these grip members have considerable width and the same is provided with a threaded opening 32 for the reception of a set screw for locking the grip 12 and 30 to the sleeve of the chuck. If the set screw is permitted to pass into one of the flutes of the chuck it provides a positive lock of the grip on the chuck sleeve.

As shown in Fig. 3 the grip 30 is provided with three corners 33, the perimeters of which are convexly rounded as indicated at 34 and a concavely rounded perimetral surface 35 joins the adjacent convexly rounded perimetral surfaces 34.

The chuck grip 12 as shown in Fig. 4 has four corners 36, each of which is provided with the convexly rounded perimetral surface 37 and the adjacent convexly rounded corners are connected by the concavely rounded surface 38.

In both the structures shown in Figs. 3 and 4, it will be noted that the wall of the grip is reduced to a dimension which is less than half the radial dimension of the corner. This provides very large knobs on each of the corners which permit the hand to grasp and quickly turn the sleeve of the chuck for loosening the same on the snake auger line. The structures as shown in Figs. 3 and 4 are full size and it will be seen that they can be readily grasped and rotated for the purpose of actuating the chuck to tighten its fingers and thus clamp the sewer auger at the proper position relative to its storage container. It is necessary to provide only a short length of sewer auger line between the chuck and the sewer as a considerable length will cause the same to curl up before it reaches the drain making it difficult to handle. Thus in some instances, it is necessary to frequently actuate the chuck for feeding small sections of the sewer auger to work the same through the sewer.

I claim:

1. An improved hand grip for rotating the sleeve of a chuck gripping a snake cleaning tool comprising a plate having a bore to receive and be secured to the chuck sleeve, a plurality of spaced corners on the perimeter of said plate, a convexly rounded perimetral surface on each of said corners, a concavely rounded perimetral surface joining adjacent convexly rounded corners to form spaced grip knobs.

2. The hand grip of claim 1 characterized in that the radial dimension from said bore to the perimeter is more than double at the center of the knob than it is intermediate said knobs.

3. The hand grip of claim 1 characterized in that there are three knobs.

4. The hand grip of claim 1 characterized in that there are four knobs.

No references cited.